United States Patent
Hong et al.

(10) Patent No.: US 8,520,939 B2
(45) Date of Patent: Aug. 27, 2013

(54) APPARATUS AND METHOD OF REPRODUCING PREFERRED COLOR

(75) Inventors: Ji-young Hong, Seongnam-si (KR); Du-sik Park, Suwon-si (KR); Young-shin Kwak, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1081 days.

(21) Appl. No.: 11/837,894

(22) Filed: Aug. 13, 2007

(65) Prior Publication Data

US 2008/0137942 A1 Jun. 12, 2008

(30) Foreign Application Priority Data

Dec. 7, 2006 (KR) .................. 10-2006-0123970

(51) Int. Cl.
*G06K 9/34* (2006.01)

(52) U.S. Cl.
USPC .......................................... 382/164

(58) Field of Classification Search
USPC .......................................... 382/164
See application file for complete search history.

(56) References Cited

U.S. PATENT DOCUMENTS

| | | | |
|---|---|---|---|
| 5,202,935 A | 4/1993 | Kanamori et al. | |
| 2004/0114798 A1 | 6/2004 | Park et al. | |
| 2004/0227964 A1 * | 11/2004 | Fujino | 358/1.9 |
| 2005/0089220 A1 * | 4/2005 | Park et al. | 382/167 |
| 2005/0105111 A1 * | 5/2005 | Ott et al. | 358/1.9 |
| 2005/0163369 A1 | 7/2005 | Jyou et al. | |
| 2006/0013478 A1 * | 1/2006 | Ito et al. | 382/167 |
| 2007/0139677 A1 * | 6/2007 | Kwak et al. | 358/1.9 |

FOREIGN PATENT DOCUMENTS

| | | |
|---|---|---|
| EP | 0709806 | 5/1996 |
| EP | 0741492 | 11/1996 |
| EP | 741492 A1 * | 11/1996 |
| EP | 1694054 | 8/2006 |
| JP | 10-75458 | 3/1998 |
| JP | 10-301948 | 11/1998 |
| JP | 2000-149018 | 5/2000 |
| JP | 2001-223911 | 8/2001 |
| JP | 2004-23177 | 1/2004 |
| KR | 1995-27622 | 10/1995 |
| KR | 1999-48313 | 7/1999 |
| KR | 2002-62557 | 7/2002 |
| KR | 2004-53500 | 6/2004 |
| KR | 2006-93821 | 8/2006 |
| WO | 01/78372 | 10/2001 |

OTHER PUBLICATIONS

Extended European Search Report, mailed Aug. 6, 2009, in corresponding European Application No. 07122333.3 (9 pp.).
Choe et al. "High Quality Image Processing for Mobile Displays," Samsung Journal of Innovative Technology. vol. 2, No. 1, Feb. 2006 pp. 119-130.
U.S. Appl. No. 11/837,879, filed Aug. 13, 2007, Kwak et al., Samsung Electronics Co., Ltd.

* cited by examiner

*Primary Examiner* — Nirav G Patel
(74) *Attorney, Agent, or Firm* — Staas & Halsey LLP

(57) ABSTRACT

An apparatus and method of reproducing a preferred color to eliminate or reduce errors caused when converting of colors of an input image in corresponding color regions of a color space, respectively, wherein the colors of an input image are included in a plurality of different color regions. The apparatus includes a region judging unit to judge whether pixels of an input image are included in one or more preset color regions, a color converting unit to execute a color conversion of the pixels in at least one conversion-desired color regions among one or more color regions that include the pixels, and an output unit to output an image formed by the color-converted pixels.

28 Claims, 10 Drawing Sheets

| SKIN | RED | GREEN | CONVERSION-DESIRED COLOR REGION |
|---|---|---|---|
| 0 | 0 | 0 | NO COLOR CONVERSION |
| 0 | 0 | 1 | GREEN COLOR REGION |
| 0 | 1 | 0 | RED COLOR REGION |
| 0 | 1 | 1 | RED COLOR REGION |
| 1 | 0 | 0 | SKIN COLOR REGION |
| 1 | 0 | 1 | SKIN COLOR REGION |
| 1 | 1 | 0 | SKIN COLOR REGION |
| 1 | 1 | 1 | SKIN COLOR REGION |

COLOR REGION TABLE

WEIGHT VALUE TABLE

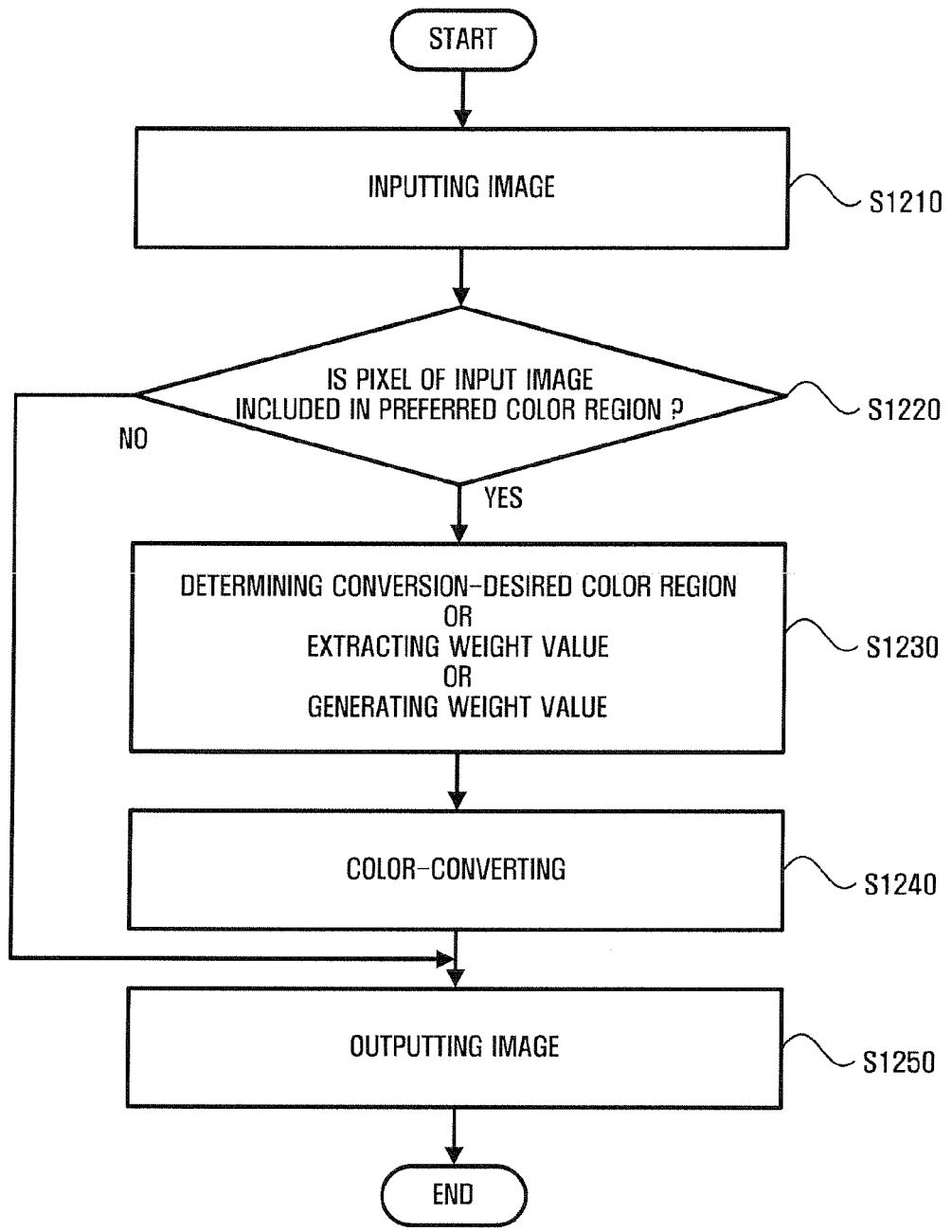

APPARATUS AND METHOD OF REPRODUCING PREFERRED COLOR

CROSS-REFERENCE TO RELATED APPLICATION

This application claims the benefit of Korean Application No. 10-2006-0123970, filed Dec. 7, 2006 in the Korean Intellectual Property Office, the disclosure of which is incorporated herein by reference.

BACKGROUND OF THE INVENTION

1. Field of the Invention

Aspects of the present invention relate generally to an apparatus and method of reproducing a preferred color, and more particularly to an apparatus and method of reproducing a preferred color, which can eliminate or reduce errors caused by colors of an input image included in a plurality of different color regions that are converted upon conversion of the corresponding color regions.

2. Description of the Related Art

A memory color conversion technique applied to a display apparatus or output software, which outputs a still image or a moving image, allows a color included in a region that can be sensed by human eyes, such as skin color, sky color, etc., to be converted into a preferred color, to thereby improve the quality of the image or images.

A method of converting a color of the image into a user's preferred color in this manner involves executing color conversion of a color of an input image on a corresponding color region among a plurality of color regions included in a color space. However, an error may be caused in the color conversion because the colors of the input image are included in different color regions.

Therefore, a color conversion method is needed which reflects a characteristic of each color region that takes account of colors of an input image that are included in overlapped regions between the different color regions.

SUMMARY OF THE INVENTION

Accordingly, aspects of the present invention has been made to solve the above-mentioned problems occurring in the related art, and other problems, and an aspect of the present invention is to provide an apparatus and method of reproducing one or more preferred colors, in which when converting of the colors of the image on corresponding color regions of a color space is to be performed, and if colors of an input image are included in a plurality of different color regions, then a specific color region is set as a color region according to a combination of overlapped color regions, or a weight value is assigned to each of the color regions included in the combination, to have color conversion be executed or performed.

In order to accomplish these and/or other aspects and advantages, an apparatus of reproducing a preferred color includes: a region judging unit to judge whether pixels of an input image are included in one or more preset color regions; a color converting unit to execute color conversion of the pixels in at least one conversion-desired color region among one or more color regions that include the pixels; and an output unit to output an image formed by the color-converted pixels. In another aspect of the present invention, a method of reproducing a preferred color includes: judging whether pixels of an input image are included in one or more preset color regions; executing a color conversion of the pixels in at least one conversion-desired color region among one or more color regions that include the pixels; and outputting an image formed by the color-converted pixels.

In another aspect of the present invention, a preferred color reproducing method includes determining if colors of an input image are included in one or more different color regions of the input image, selectively setting the one or more different color regions to undergo color conversion, or assigning weight values that are used to convert the colors of the one or more different color regions, based on whether the colors of the input image are included in one, two or more, or none of the one or more different color regions, and selectively performing color conversion of the colors of the input image based on the setting or the assigning.

In another aspect of the present invention, a preferred color reproducing apparatus includes a processor to determine whether colors of an input image are included in one or more different color regions of the input image, to selectively set the one or more different color regions to undergo color conversion or assigning weight values that are used to convert the colors of the one or more different color regions based on whether the colors of the input image are included in one, two or more, or none of the one or more different color regions, and to selectively perform color conversion of the colors of the input image based on the setting or the assigning, and a display to display an output image containing color-converted input image. Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which:

FIG. 11 is a flowchart illustrating a process of reproducing a preferred color according to an aspect of the present invention.

DETAILED DESCRIPTION OF THE EMBODIMENTS

Figure 1A:
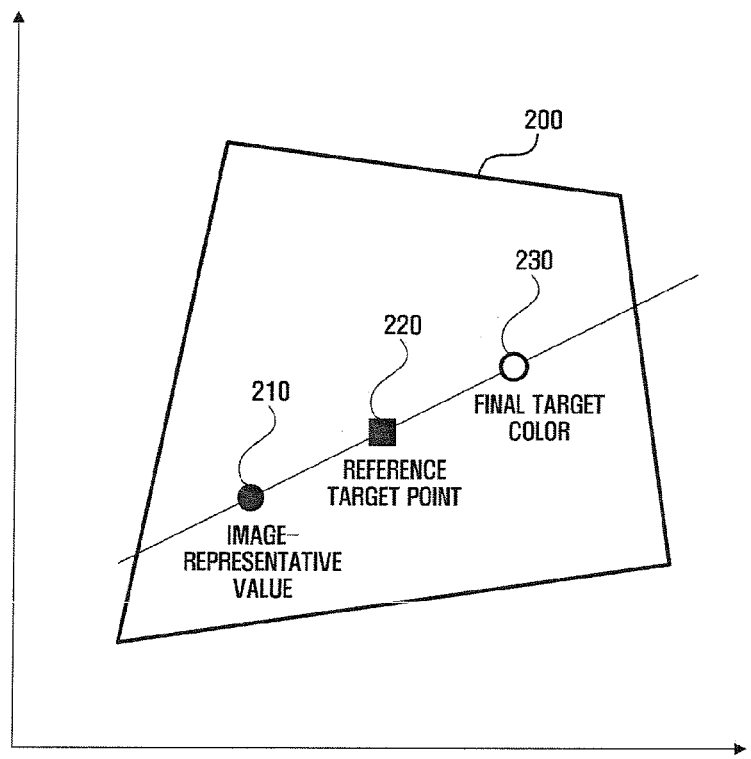
FIGS. 1A and 1B show color-conversion of a pixel of an input image according to an aspect of the present invention.

Reference will now be made in detail to aspects of the present invention, examples of which are illustrated in the accompanying drawings, wherein like reference numerals refer to the like elements throughout. The aspects are described below in order to explain the present invention by referring to the figures.

Figure 1B:
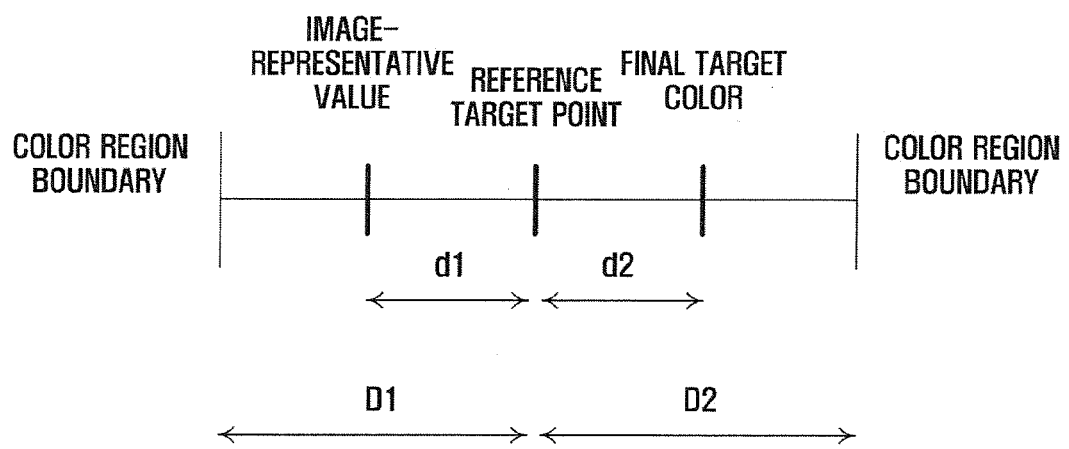

FIGS. 1A and 1B show color-conversion of a pixel of an input image according to an aspect of the present invention. A conversion-desired color region 200 (or a color region 200) indicates a region of pixels to be color-converted. Although FIG. 1A shows that the color region 200 is defined by four straight lines, this is merely an example. In various aspects, the color region 200 can be formed in an elliptical or multi-dimensional shape. That is, the color region 200 is not limited to a specific region (shape or area) as the color region 200 serves to provide a boundary 201to distinguish a group of pixels that is to be color-converted from other pixels that are not to be color-converted.

Figure 5:
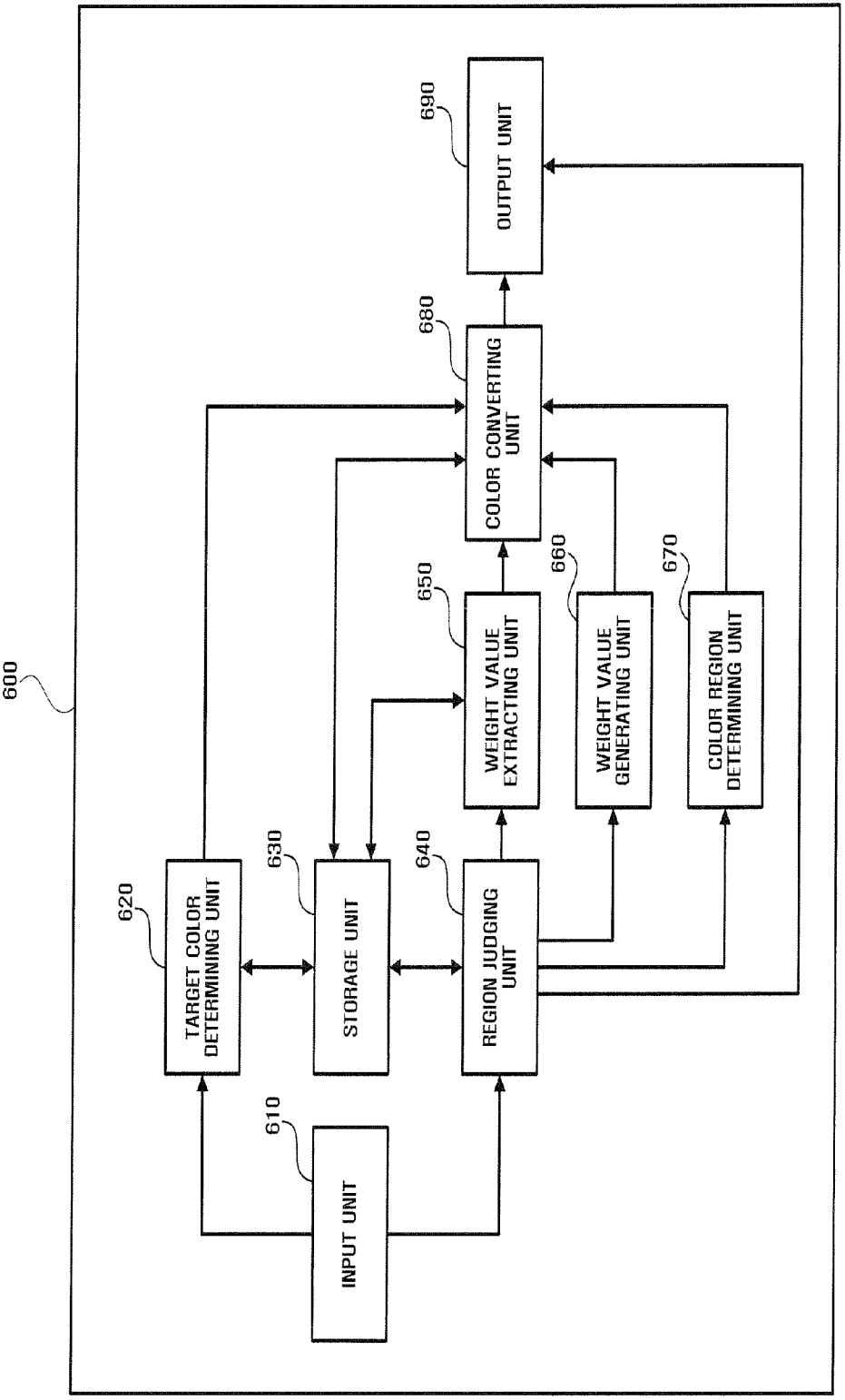
FIG. 5 is a block diagram illustrating an apparatus to reproduce a preferred color.

Information of the color region 200 may be stored in a storage unit 630, which is provided in a preferred color reproducing apparatus 600 of FIG. 5. Alternatively, the information of the color region 200 can be updated according to a hardware or software characteristic of the preferred color reproducing apparatus 600. In addition, the information of the color region 200 can be variously inputted from the outside, depending on one or more images or an image type.

As shown in FIG. 1A, a reference target point 220 exists in the color region 200. The reference target point 220 refers to a point, which is a target in converting the pixels included in the color region 200.

If the color region 200 provides a boundary 201, which is commonly (or generally) applied to input images to determine whether to color-convert the pixels, it is possible to calculate an image-representative value 210, from each image that is inputted, for every instance. The image-representative value 210 is a value determined on the basis of representative color values of the pixels, which are included in a specific region, among all the pixels of the input images. In an aspect of the present invention, the image representative value 210 is a mean value or a value based on the highest frequency of colors. In various aspects, the specific region is in the color region 200.

In order to convert the image-representative value 210 into the reference target point 220, it is possible to calculate target color coordinates that correspond to a final target color 230. If the image-representative value 210 is converted with reference to the final target color 230, the conversion result of the image-representative value 210 consequently (or resultantly) approaches the reference target point 220.

The final target color 230 can be calculated by various techniques or methods. As shown in FIGS. 1A and 1B, it is possible to determine the point (or the coordinates) of the final target color 230 by using a distance between the intersections of the boundary 201 of the color region 200 and a straight line passing through both the image-representative value 210 and the reference target point 220. For example, it is possible to determine d2 by applying a proportional expression, d1: D1=d2:D2. In addition, it is possible to determine the final target color 230 by applying various variables, relationships, or equations. If the final target color 230 is determined, color conversion is executed for the pixels existing (or included) in the color region 200 among those of the input image.

Figure 2:
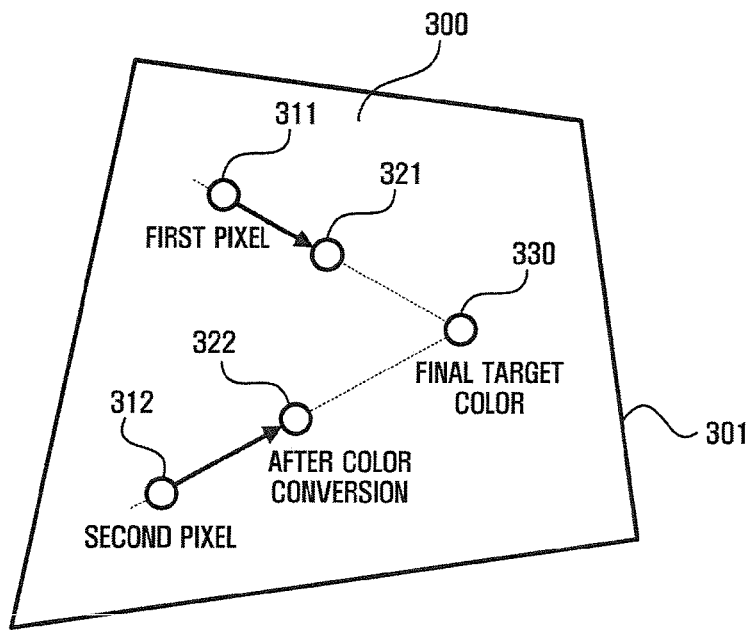
FIG. 2 shows color conversion executed for pixels of a conversion-desired color region according to an aspect of the present invention.

FIG. 2 shows color conversion executed for pixels of a conversion-desired color region according to an aspect of the present invention. In the aspect shown, two pixels of an input image of the conversion-desired color region 200 are color-converted.

As described above with reference to FIGS. 1A and 1B, and by using the method, the final target color 330 is determined, depending on the representative values 311 and 312 of the pixels in the conversion-desired color region 300 (or the color region 300) among the pixels of the input image, and also depending on a reference target point (not shown) of the color region 300. Among the pixels of the input image, color conversion to (or towards) the final target color 330 is executed for the first and second pixels 311, 312. The result of the color conversion is the values 321 and 322, respectively. The values 321 and 322 are adjacent to the reference target value (not shown) within the color region 300. No color conversion occurs at the color region boundary 301 and the target color 330, and the color conversion successively proceeds toward the target color. Meanwhile, because the various input images are different from each other, the image-representative value that is extracted from each of the various input images is varied (or different) depending on the input images. Because the image-representative value is varied depending on the images, the final target color obtained from the image-representative value is also varied. Because the pixels convert in color by aiming for the final target color, the direction of the color conversion (or a change from one color to another) is varied if the final target color is varied. Therefore, color conversion can be executed adaptively to an image that is input.

Figure 3:
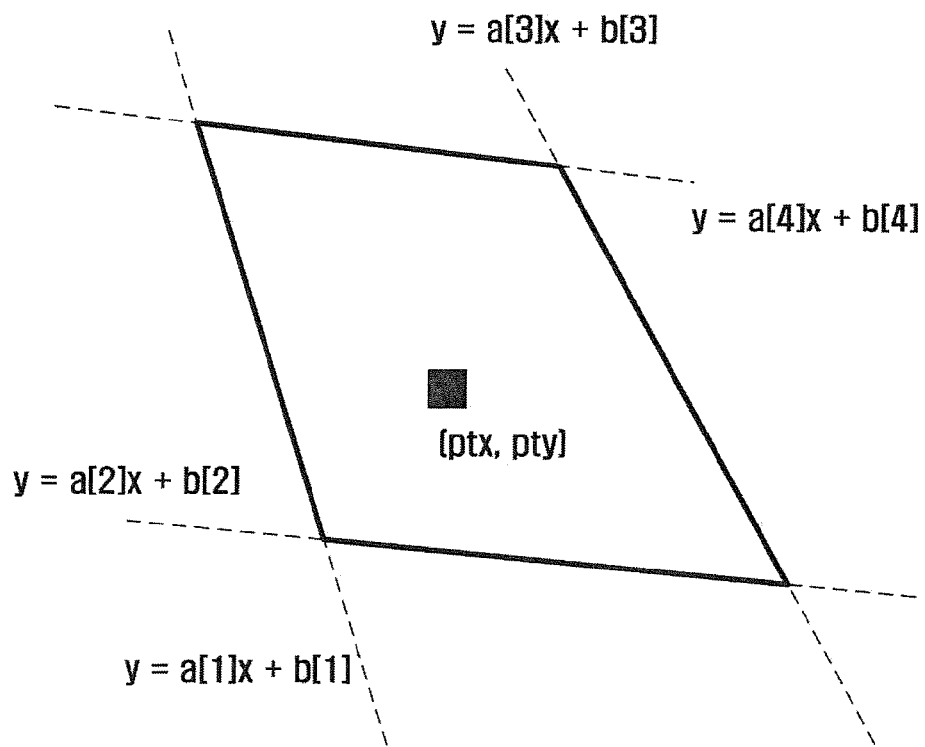
FIG. 3 shows a pixel of an input image included in a conversion-desired color region according to an aspect of the present invention.

FIG. 3 shows a pixel of an input image included in a conversion-desired color region according to an aspect of the present invention. In this aspect, the boundary of the conversion-desired color region is defined by four straight lines. In FIG. 3, to determine whether coordinates (ptx, pty) of a specific pixel of an input image in a color space are included in the conversion-desired color region, equation (1) below can be used:

$$pty > (a[1] \cdot ptx + b[1])$$

$$pty > (a[2] \cdot ptx + b[2])$$

$$pty < (a[3] \cdot ptx + b[3])$$

$$pty < (a[4] \cdot ptx + b[4]) \qquad (1)$$

If Equation (1) is entirely met, coordinates (ptx, pty) are positioned within the color region defined by four straight lines. In the aspect shown, four straight lines define the color region. In other aspects, three straight lines may enclose or define the color region, in which case the color region is triangular. In other aspects, rather than linear or line equations to define the color region, quadratic equations, equations of higher power than quadratic equations, and/or other equations may be used to define the color region. Also, equations of ellipses, circles, parabolas, and/or other curves may be used to define the color region.

Accordingly, although FIG. 3 shows a color region defined by four straight lines, the color region can be formed in an elliptical or multi-dimensional shape as described above.

Figure 4:
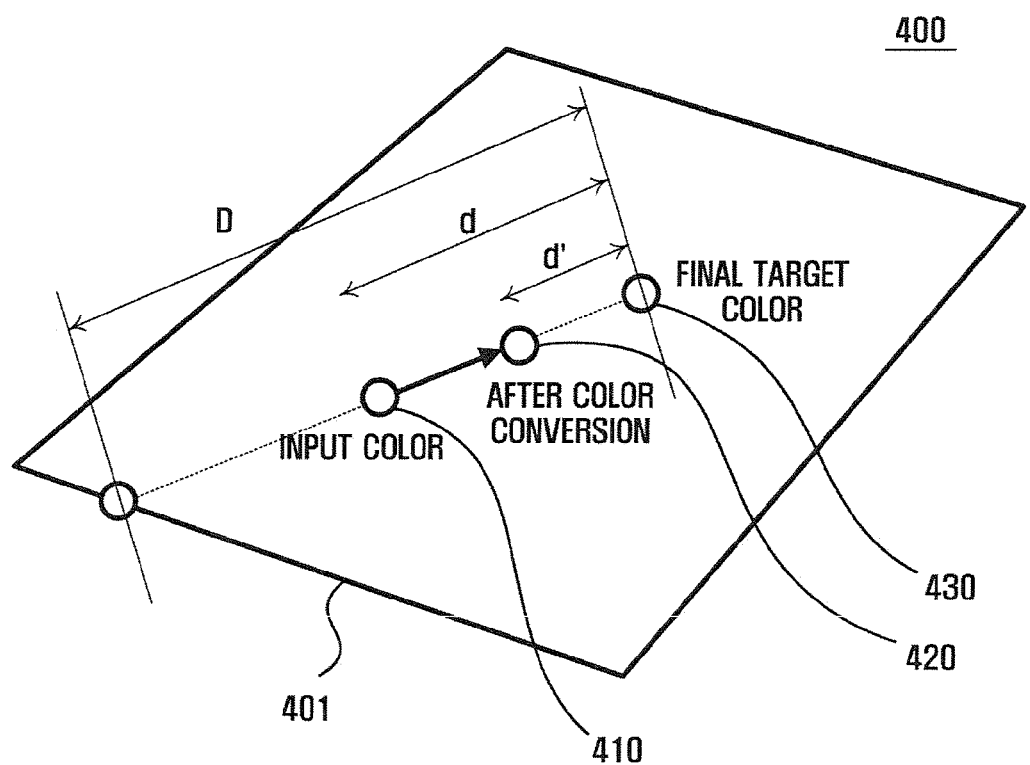
FIG. 4 shows color conversion of a pixel of an input image according to an aspect of the present invention.

FIG. 4 shows a pixel of an input image that is color-converted according to an aspect of the present invention. If an inputted pixel 410 is color-converted by targeting (or aiming for) the final target color 430, the result 420 of the color conversion is positioned between the final target color 430 and the color of the input color 410. Equation (2) below can be used for the color conversion.

$$d' = \frac{s}{D} \cdot d^2 + (1-s) \cdot d \qquad (2)$$

In Equation (2), "s" is a constant between 0 and 1. "d'" is a position value obtained by converting a color value of the result 420 of the color conversion of an input color 410 that is targeting the final target color 430. "D" is a distance from the final target color 430 to the boundary 401 of the color region 400 along a straight line passing through the final target color 430 and the input color 410. "d" refers to a distance between the input color 410 and the final target color 430 along the same line. "d'" can be adjustably calculated through the constant s.

FIG. 5 is a block diagram illustrating an apparatus to reproduce a preferred color (hereinafter, referred to as "preferred color reproducing apparatus") according to an aspect of the present invention. The preferred color reproducing apparatus 600 includes an input unit 610, a target color determining unit 620, a storage unit 630, a region judging unit 640, a weight value extracting unit 650, a weight value generating unit 660, a color region determining unit 670, a color converting unit 680, and an output unit 690.

During operation of the preferred color reproducing apparatus 600, an image is inputted through the input unit 610. In the aspect shown, the input image may be an analog image or a digital image. If the input image is an analog image, the input unit 610 can convert the input analog image into a digital image. In addition, if a color model (or space) of an input image is an RGB (Red, Green, Blue) color model (or space), which is an additive color model (or space), the input unit 610 can convert the input color model (or space) into a YCbCr, a CIE LCH (Lightness, Chroma, Hue), a CIE LAB, or a YUV color models (or spaces).

Information of a color region set as a preferred color region, i.e., a conversion-desired color region, is stored in the storage unit 630. The information of the color region can be set as a base value (or a predetermined value) when the preferred color reproducing apparatus 600 is initially produced, and can be modified according to a user's setting. In other aspects, the information for the color region may be based on external lighting conditions, and/or based on color information of the input image.

Information required or useable for the color conversion can be stored in the storage unit 630, for example, with a graphic tool to process the image information. Also, to improve a skin color reproduction function of an image containing a number of human figures, it is possible to store information of a skin color region and a reference target point thereof, for example. In addition, information of a target point, which serves as a reference for the pixels in a conversion-desired color region, can be stored in the storage unit 630.

Furthermore, a color region table 1000 (shown in FIG. 9) and a weight value table 1100 (shown in FIG. 10) can be stored in the storage unit 630. The color region determining unit 670 and the weight value extracting unit 650 can determine one or more conversion-desired color regions or extract one or more weight values, respectively, to execute color conversion in each conversion-desired color region by using the color region table 1000 and the weight value table 1100, respectively.

The storage unit 630 may be a module or an apparatus capable of inputting/outputting information, such as a hard disc, a flash memory, a CF card (compact flash card), an SD card (secure digital card), an SM card (Smart Media Card), an MMC (multimedia card), or a memory stick, which can be provided in or to the preferred color reproducing apparatus 600 or in a separate apparatus. If the storage unit 630 is provided in a separate apparatus, the information stored in the storage unit 630 can be received through a communication apparatus/method.

The target color determining unit 620 serves to determine a representative value and a final target value of the input image. For this purpose, the target color determining unit 620 may include a representative value calculating unit (not shown), and a target coordinates determining unit (not shown). The representative value calculating unit judges whether each pixel is included in a specific color region for all of the pixels of the input image, and then determines and transmits (or outputs) a representative value of each of the color values of the pixels of the specific color region to the target coordinates determining unit.

The target coordinates determining unit calculates the coordinates of a new final target color on the basis of the representative value transmitted (or output) from the representative value calculating unit and the reference target point stored in the storage unit 630. The final target color described with reference to FIGS. 1A, 1B, and 2 is the new target color. The coordinates of the new final target color are transmitted to the color converting unit 680 to be used as a parameter for color-converting the pixels of the input image.

The region judging unit 640 serves to judge whether pixels of the input image are included in a preset color region. In this aspect, the "preset color region" refers to a preferred color region. The region judging unit 640 may refer to information of color regions stored in the storage unit 630. The region judging unit 640 can judge whether a corresponding pixel is included in the preferred color region by using a straight line, a curved line equation, and/or a curve equation to differentiate color regions, as described above with reference to FIG. 1. According to the judging result of the region judging unit 640, the corresponding pixel may be included in one preferred color region, two or more preferred color regions, or no preferred color region.

If the corresponding pixel is included in one of the preferred color regions or in two or more preferred color regions, the judging information is transmitted to the weight value extracting unit 650, the weight value generating unit 660, and/or the color region determining unit 670. If the corresponding pixel is not included in any of the preferred color regions, the corresponding pixel is directly transmitted to the output unit 690, and is then outputted. In various aspects, the output unit 690 may be a display device.

In the aspect shown, the judging information from the region judging unit 640 includes whether the corresponding pixel is included in a specific preferred color region. For example, if the corresponding pixel is included in a skin color region and a red color region, the region judging unit 640 may transmit a flag notifying the inclusion of the pixel to the weight extracting unit 650, the weight generating unit 660, and/or the color region determining unit 670.

Meanwhile, the weight value extracting unit 650, the weight value generating unit 660, or the color region determining unit 670 transmits different information items to the color converting unit 680, so that color conversion is executed. As a result, the color converting unit 680 is capable of executing color conversion by using an information item received from one of the weight value extracting unit 650, the weight value generating unit 660, and the color region determining unit 670, any combinations thereof, or the information items received from all of these units. Hereinafter, color conversion executed with one or more information items will be described.

In the aspect shown, the color region determining unit 670 serves to determine a conversion-desired color region with reference to a combination of one or more color regions that includes pixels of an input image. In the aspect shown, the conversion-desired color region refers to a color region where color conversion of pixels actually occurs. The conversion-desired color region may include one or more color regions.

Figure 9:
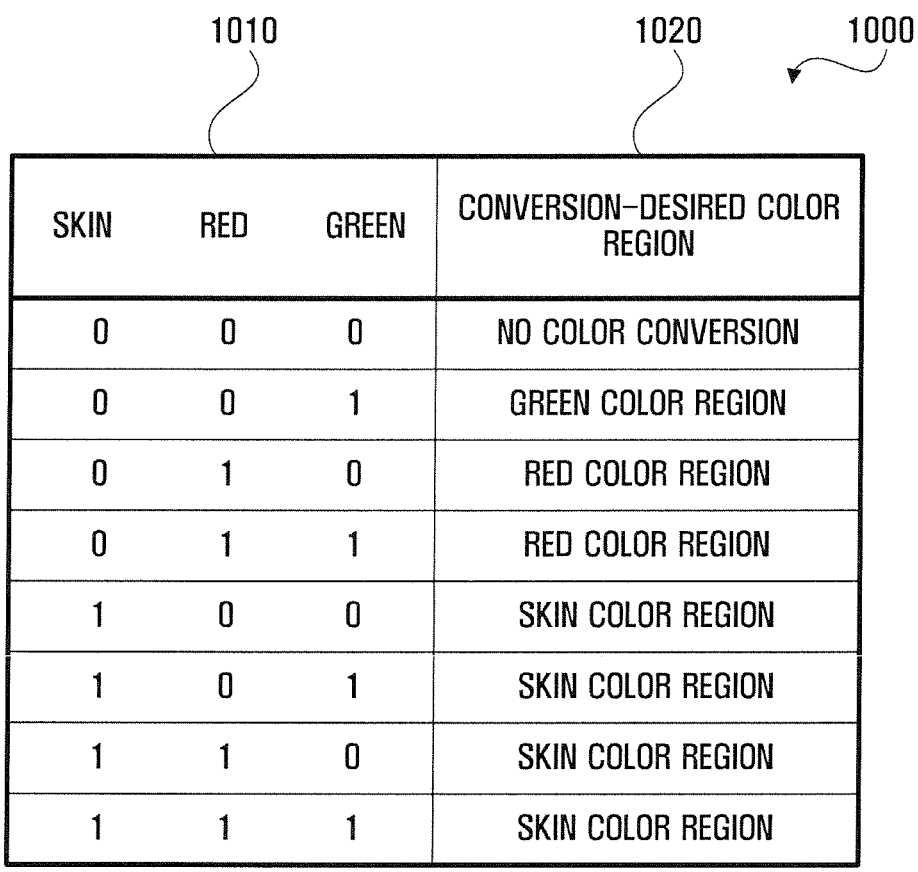
FIG. 9 shows a color region table according to an aspect of the present invention.
Figure 10:
FIG. 10 shows a weight value table according to an aspect of the present invention.

In the aspect shown, in order to determine a conversion-desired color region, the color region determining unit 670 may use the color region table 1000 shown in FIG. 9. The color region table 1000 includes a preferred color field 1010 and a conversion-desired color region field 1020. The preferred color field 1010 represents whether one or more pixels of an input image are included in a corresponding preferred color region. In this aspect, "1" indicates that at least one pixel is included in a preferred color region, and "0" indicates that no pixel is included in a preferred color region, wherein information related to the inclusion of the pixel is transmitted or output from the region judging unit 640.

The conversion-desired color region field 1020 represents color regions for which execution of the color conversion is desired for a corresponding pixel. Referring to the color region table 1000 by way of an example, if the corresponding pixel is included in the green color region, the conversion-desired color region is the green color region. If the corresponding pixel is included in the red color region, the conversion-desired region is the red color region. If the corresponding pixel is included in both the red color region and the green color region, the conversion-desired color region is the red color region. In the aspect shown, if the corresponding pixel is included in the skin color region, then the conversion desired color region is the skin color region. The values included in each field of the color region table 1000 can be corrected (or changed) according to the user's selection.

Referring back to FIG. 5, the weight value extracting unit 650 serves to extract one or more weight values to execute color conversion on a conversion-desired color region with reference to a combination of one or more color regions that includes pixels of an input image. In the aspect shown, in order to extract the weight values, the weight value extracting unit 650 may use the weight value table 1100 shown in FIG. 10. The weight value table 1100 includes a preferred color field 1110 and a weight value field 1120, wherein preferred color field 1110 represents whether at least one pixel of an input image is included in a corresponding preferred color region. In the aspect shown, "1" indicates that at least one pixel is included in a corresponding preferred color region, and "0" indicates that no pixel is not included in a corresponding preferred color region, wherein the information related to the inclusion of the pixel is transmitted (or output) from the region judging unit 640.

Weight value field 1110 represents weight values to be applied when color conversion is executed or performed for a corresponding pixel. Referring to the weight value table 1100 by way of an example, if the corresponding pixel is included in the green color region, the weight values assigned to the skin color region (the first weight value), the red color region (the second weight value), and the green color region (the third weight value), which are conversion-desired color regions, are 0, 0, and 1, respectively. If the corresponding pixel is included in both the red color region and the green color region, the weight values assigned to the skin color region (the first weight value), the red color region (the second weight value), and the green color region (the third weight value) are 0, 0.5, and 0.5, respectively. Accordingly, if the corresponding pixel is included in only one of the color regions of the preferred color field 1110, only the corresponding one of the weight values is 1. If the corresponding pixels are included in only two of the color regions of the preferred color field 1110, only the corresponding two of the weight values are 0.5, respectively, though not required. If the corresponding pixels are included in all three of the color regions of the preferred color field, the first weight value is 0.4, the second weight value is 0.3, and the third weight value is 0.3, though not required. Other allocations of the weight values are within the scope of the present invention.

The weight values extracted by the weight value extracting unit 650 are transmitted to the color conversion unit 680, which in turn applies the received weight values to the respective conversion-desired color regions when executing color conversion of the corresponding pixel.

Referring back to FIG. 5, the weight value generating unit 660 serves to generate a weight value for each preferred color with reference to the frequency of a color (which corresponds to a preferred color region) included in an input image, for example. In order to determine the frequency of the specific color that is included in the input image, the region judging unit 640 converts the input image into a color space and judges whether each pixel of the input image corresponds to a preset color region. As a result, the region judging unit 640 is capable of judging the frequency of the color of the input images.

When generating weight values, the weight value generating unit 660 may generate one or more weight values with reference to the entire input image. Alternatively, the weight value generating unit 660 may divide an input image into a plurality of zones (or regions) and generate a weight value for each divided zones (or region). As a result, the weight value for the entire image or the weight values for the respective divided image zones (or regions) are transmitted to the color converting unit 680. Accordingly, the color conversion unit 680 can execute or perform color conversion by applying one weight value of the input image or by applying different weight values of the individual zones (or regions) of the input image.

A weight value extracted by the weight value extracting unit 650 or generated by the weight value generating unit 660 may have a value of 0 through 1 according to the weight in each color region, wherein the sum of the weight values in all of the color regions is 1, though not required. In various aspects, the sum may be any number.

The color converting unit 680 serves to color-convert a pixel in the conversion-desired color region. That is, the color converting unit 680 executes color conversion in such a manner that a representative value of a color of a pixel included in a conversion-desired color region approaches a final target color directed to a reference target point of the conversion-desired color region.

In the aspect shown, in executing the color conversion, the color converting unit 680 executes the color conversion on a conversion-desired color region from which the corresponding pixel is transmitted (or output) as described above with reference to FIGS. 1A, 1B, and 2, when the color converting unit 680 is informed of the conversion-desired color region from the color region determining unit 670. Once the color converting unit 680 receives one or more weight values from the weight value extracting unit 650 or the weight value generating unit 660, the color converting unit 680 applies the received weight values to the color conversion operations described with reference to FIGS. 1A, 1B, and 2.

The output unit 690 serves to output an image formed by the color-converted pixels transmitted (or output) from the color converting unit 680. Meanwhile, the pixels not included in a preferred color region among the pixels of the input image according to the judging result of the region judging unit 640 are directly transmitted (or output) to the output unit 690 to be outputted without being color-converted.

The output unit 690 is a module or a device provided with (or included in) an image display apparatus, such as a CRT (Cathode Ray Tube), an LCD (Liquid Crystal Display), an LED (Light-Emitting Diode), an OLED (Organic Light-Emitting Diode), or a PDP (Plasma Display Panel), and/or a similar device, that can display input image signals, and displays received image information.

Figure 6:
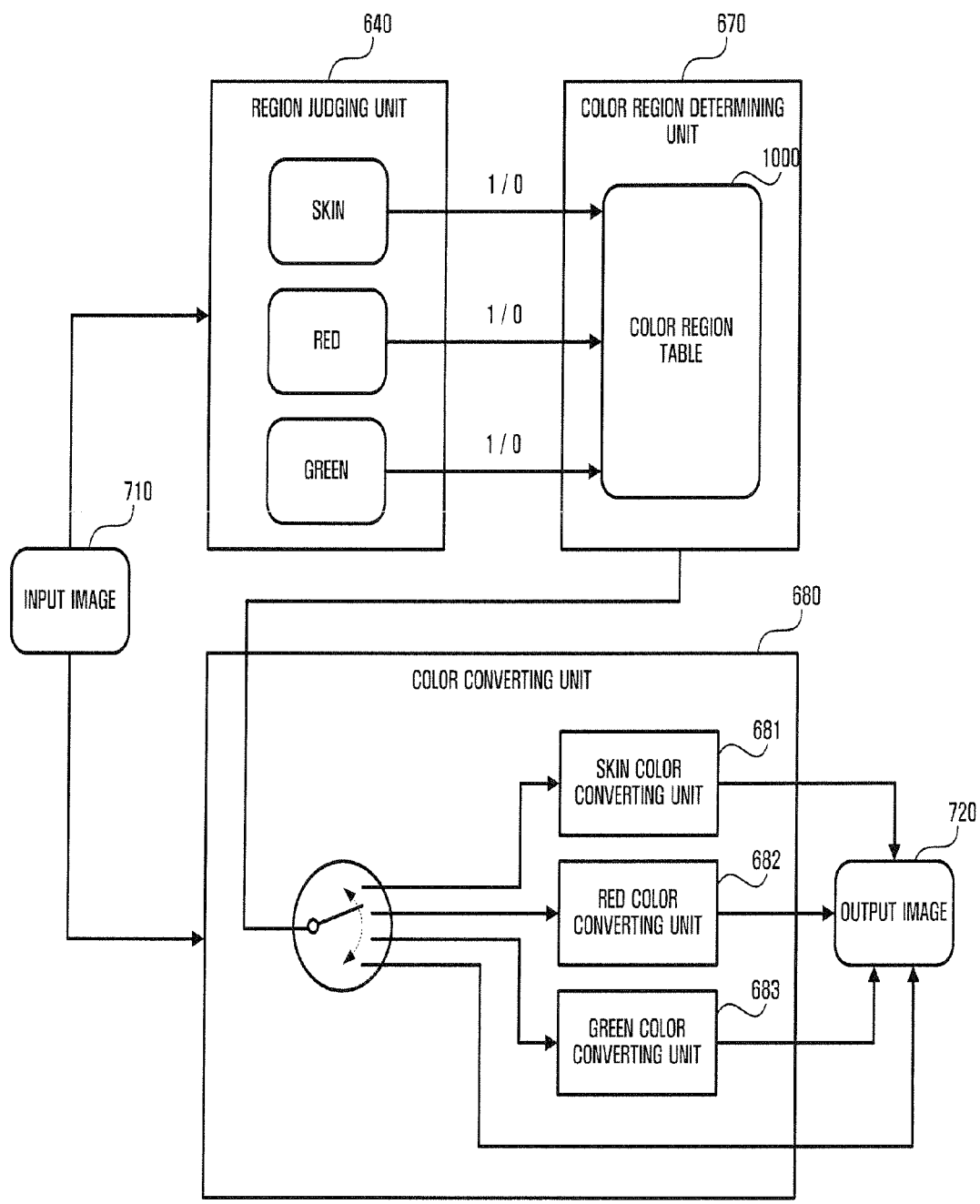
FIG. 6 is a schematic view illustrating a color conversion executed on a determined color region according to an aspect of the present invention.

FIG. 6 is a schematic view illustrating color conversion executed on a determined color region according to an aspect of the present invention. An input image 710 is transmitted to the region judging unit 640 and the color converting unit 680. Then, the region judging unit 640 judges whether a pixel of the input image 710 is included in a preferred color region. If the region judging unit 640 judges that a corresponding pixel is included in a preferred color region, the region judging unit 640 sets a flag of the corresponding preferred color region as 1. If the region judging unit 640 judges that the corresponding pixel is not included in the preferred color region, the region judging unit 640 sets the flag of the preferred color region as 0, and then the region judging unit 640 transmits (or outputs) the flag to the color region determining unit 670. FIG. 6 shows that skin color, red color, and/or green color are set as the preferred colors.

Upon receiving a flag for each preferred color region, the color region determining unit 670 determines the one or more conversion-desired color regions with reference to the color region table 1000 stored in the storage unit 630, and informs the color converting unit 680 of the determined conversion-desired color regions.

As a result, among the skin color converting unit 681, the red converting unit 682, and the green converting unit 683 of the color converting unit 680, one that is a preferred color converting unit executes the color conversion. For example, if the informed conversion-desired color region is the skin color region, the skin color converting unit 681 executes the color conversion of the corresponding pixel. The pixel that is color-converted in this manner is applied to the image inputted into the color converting unit 680, to thereby configure (or constitute) an output image 720.

Meanwhile, if the region judging unit 640 or the color region determining unit 670 judges that a corresponding pixel is not included in the preferred color regions, the corresponding pixel can directly configure (or constitute) the output image 720 without undergoing any color-conversion, and the output image 720 can be outputted through the output unit 690.

Figure 7:
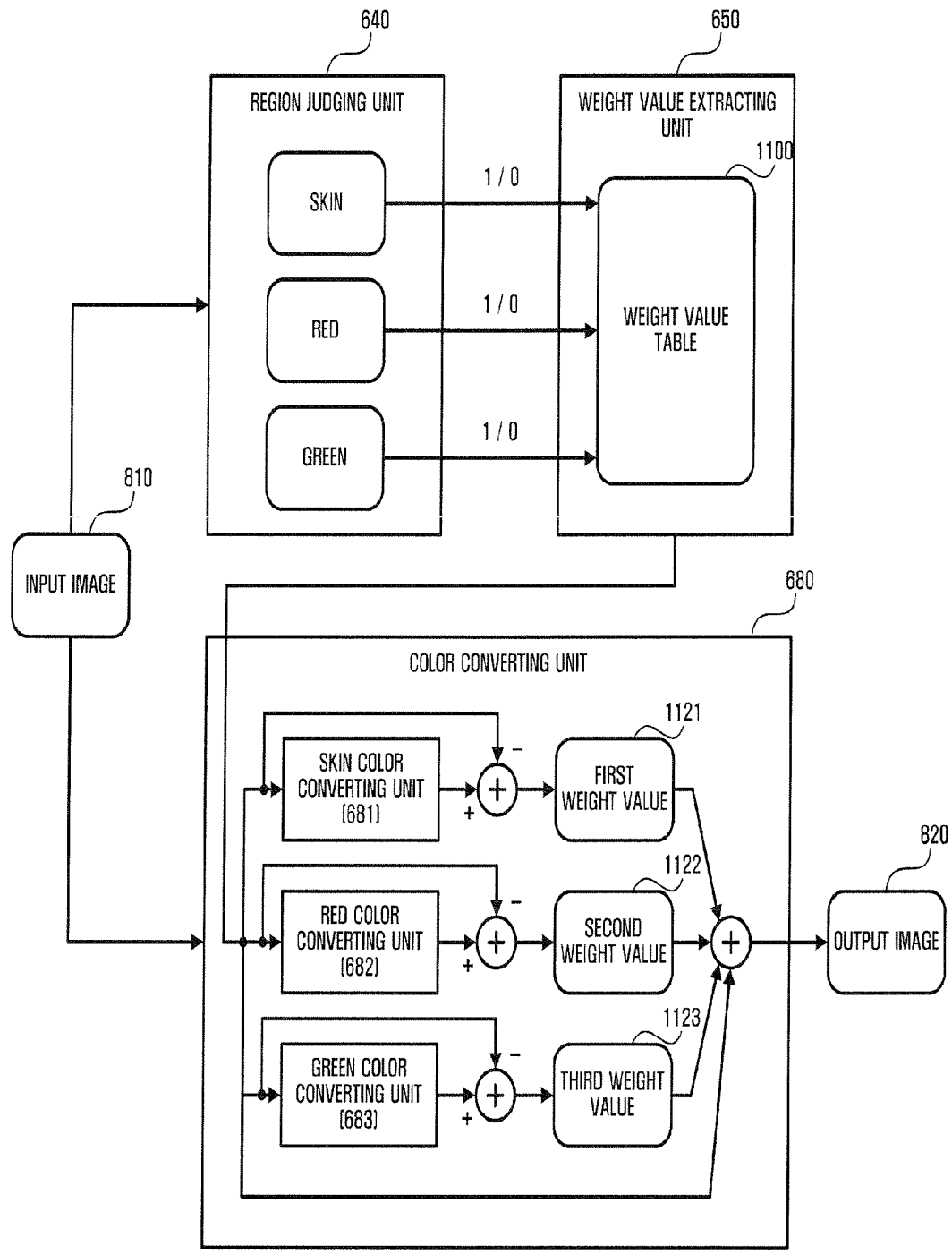
FIG. 7 is a schematic view illustrating color conversion executed by applying extracted weight values according to an aspect of the present invention.

FIG. 7 is a schematic view illustrating color conversion executed by applying an extracted weight values according to an aspect of the present invention. An input image 810 is transmitted to the region judging unit 640 and the color converting unit 680. The region judging unit 640 judges whether a pixel is included in a preferred color region. If the region judging unit 640 judges that the corresponding pixel is included in the preferred color region, the region judging unit 640 sets a flag of the corresponding preferred color region as 1. If the region judging unit 640 judges that a corresponding pixel is not included in the preferred color region, the region judging unit 640 sets a flag of the corresponding preferred color region as 0, wherein the flag is transmitted (or output) to the weight value extracting unit 650. FIG. 7 indicates that skin color, red, and/or green are set as the preferred colors.

Upon receiving flags of respective color regions, the weight value extracting unit 650 extracts weight values 1121, 1122, and/or 1123 for the respective preferred colors with reference to the weight value table 1100 stored in the storage unit 630, and transmits the extracted weight values 1121, 1122, and/or 1123 to the color converting unit 680.

As a result, the skin color converting unit 681, the red color converting unit 682, and/or the green color converting unit 683 of the converting unit 680-execute color conversion of the corresponding pixels, respectively. In this aspect, each of the preferred ones of the color converting units may execute conversion of all the corresponding pixels regardless of whether the pixels of the input image 810 are included in a corresponding preferred color region.

In addition, the weight values 1121, 1122, and/or 1123 extracted to correspond to the preferred colors are applied to the color-converted results of the preferred color converting units, respectively, and the results obtained by applying the weight values 1121, 1122, and/or 1123 to the preferred colors are all combined with each other, whereby the color conversion of the corresponding pixels is completed. The pixels that are color-converted in this manner are applied to the image 810 inputted into the color converting unit 680, to thereby configure (or constitute) an output image 820.

If the region judging unit 640 or the weight value extracting unit 650 determines that a pixel is not included in the preferred color region, the corresponding pixel can directly configure or (constitute) the output image 820 and can be outputted through the output unit 690.

Figure 8:
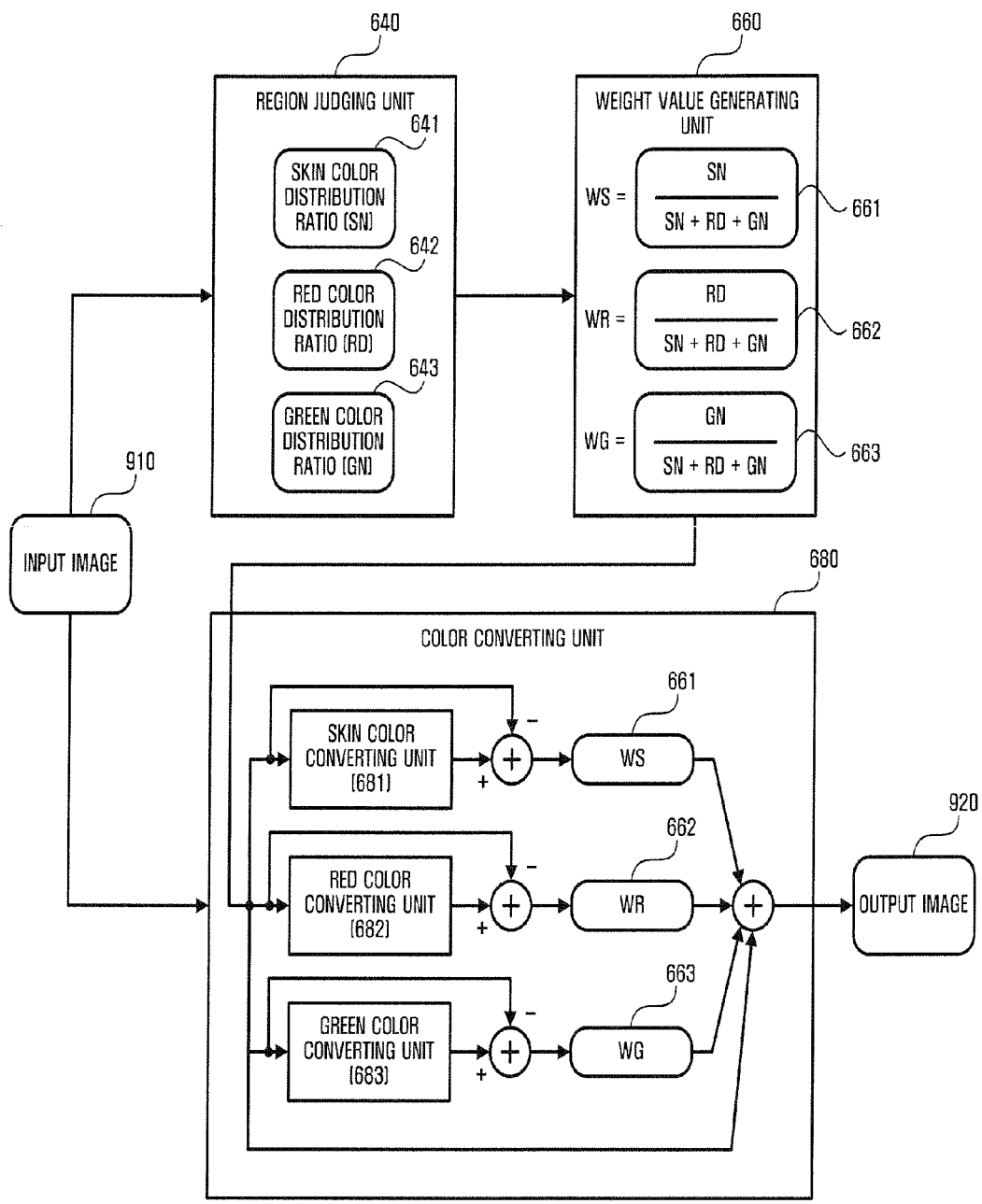
FIG. 8 is a schematic view illustrating color conversion executed by applying weight values generated according to an aspect of the present invention.

FIG. 8 is a schematic view illustrating color conversion executed by applying weight values generated according to an aspect of the present invention. An input image is transmitted to the region judging unit 640 and the color converting unit 680. As a result, the region judging unit 640 judges distribution ratios of skin color 641, red color 642, and/or green color 643, each of which corresponds to a preferred color region that is included in an input image 910. The judged distribution ratios of the respective preferred color regions are transmitted to the weight value generating unit 660, which in turn generates weight values 661, 662, and/or 663 with reference to the received distribution ratios 641, 642, and/or 643, and transmits the generated weight values 661, 662, and/or 663 to the color converting unit 680.

As a result, the skin color converting unit 681, the red color converting unit 682, and/or the green color converting unit 683 execute color conversion of the corresponding pixels, respectively. Here, each of the preferred color converting units may convert all of the corresponding pixels regardless of whether the pixels of the input image are included in the corresponding preferred color regions, respectively.

In addition, the weight values 661, 662, and/or 663 generated to correspond to the preferred colors are applied to the color-converted results of the preferred ones of the color converting units, respectively, and the results obtained by applying the weight values 661, 662, and/or 663 to the preferred colors are all combined with each other, whereby the color conversion of the corresponding pixels is completed. The pixels that are color-converted in this manner are applied to the image 910 inputted into the color converting unit 680, to thereby configure (or constitute) an output image 920.

If the region judging unit 640 determines that a pixel is not included in any of the preferred color regions, the corresponding pixel can directly configure (or constitute) the output image 920 and may be outputted through the output unit 690.

FIG. 11 is a flowchart illustrating a process of reproducing preferred colors according to an aspect of the present invention. In order to reproduce preferred colors, an image is inputted through the input unit 610 of the preferred color reproducing apparatus 600 (operation S1210). The region judging unit 640 judges whether the pixels of the input image are included in preferred color regions (operation S1220). If a corresponding pixel is included in a preferred color region, the color region determining unit 670 determines a conversion-desired color region with reference to the color region table 1000, the weight value extracting unit extracts weight values with reference to the weight value table 1100, or the weight value generating unit 660 generates weight values with reference to the distribution ratios of the colors included in the input image (operation S1230).

Then, the color converting unit 680 executes color conversion of the corresponding pixel on the conversion-desired color region informed or determined by the color region determining unit 670, or applies weight values received from the weight value extracting unit 650 or the weight value generating unit 660 to the preferred color regions, to thereby execute color conversion of the corresponding pixel (operation S1240).

Then, the output unit 690 applies the color-converted pixels received from the color converting unit 680 to the input image, to thereby form and output an output image (operation S1250). Meanwhile, if a pixel of the input image is not included in any of the preferred color regions, the pixel is directly transmitted to the output unit 690 without being color-converted and is outputted (operation S1250).

According to the various aspects of the apparatus and method of reproducing preferred colors, color conversion is executed by setting a specific region as a color region to execute color conversion according to a combination of overlapped color regions, or by applying weight values of respective color regions that are included in a combination thereof, whereby preferred colors can be more effectively reproduced.

In one or more aspects, various components of the preferred color reproducing apparatus 600, as shown in FIG. 5, such as the target color determining unit 620, the region judging unit 640, the weight value extracting unit 650, the weight value generating unit 660, the color region determining unit 670, and/or the color converting unit 680 can be integrated into a single control unit or processor, or alternatively, can be implemented in software or hardware, such as, for example, a field programmable gate array (FPGA), or an application specific integrated circuit (ASIC). As such, it is intended that the processes described herein be broadly interpreted as being equivalently performed by software, hardware, or a combination thereof.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. An apparatus to reproduce a preferred color, the apparatus comprising:
    a region judging unit to judge whether pixels of an input image are included in one or more preset color regions;
    a target color determining unit to determine a representative value of the input image and a final target color of a conversion-desired color region, wherein the representative value is a value included in the conversion-desired color region, and the final target color is determined by using the representative value and a reference target point assigned to the conversion-desired color region;
    a color converting unit to execute a color conversion of the pixels in at least one conversion-desired color region, including the conversion-desired color region, among the one or more preset color regions that include the pixels; and
    an output unit to output an image formed by the color-converted pixels;
    wherein the preset color regions are defined prior to initially loading an image for display,
    color conversion of one color region may supersede the color conversion of another color region, and
    the color conversion is performed by moving the pixels close to the final target color.

2. The apparatus of claim 1, further comprising a color region determining unit to determine the at least one conversion-desired color region with reference to a combination of the one or more color regions that include the pixels.

3. The apparatus of claim 1, wherein the color converting unit executes the color conversion of the pixels by applying weight values to the at least one conversion-desired color region, wherein the weight values correspond to combinations of one or more color regions.

4. The apparatus of claim 3, further comprising a weight value extracting unit to extract the weight values.

5. The apparatus of claim 1, wherein the color converting unit executes the color conversion by applying weight values of the one or more color regions to the at least one conversion-desired color region, wherein the weight values are generated with reference to a frequency of each of the colors that correspond to the one or more preset color regions.

6. The apparatus of claim 5, further comprising a weight value generating unit to generate the weight values.

7. The apparatus of claim 1, wherein the region judging unit judges whether the pixels are included in the one or more preset color regions by using a straight line or a curve equation to differentiate the one or more preset color regions from each other.

8. The apparatus of claim 1, wherein the representative value is a mean value or a highest frequency value of the colors of the pixels included in the at least one conversion-desired color region.

9. The apparatus of claim 1, wherein the final target color is positioned at a distance proportional to the distance between the representative value and the reference target point, and at a point symmetrical to the representative value in reference to the reference target point.

10. A method of reproducing a preferred color, the method comprising:
    judging whether pixels of an input image are included in one or more preset color regions;
    determining a representative value of the input image and a final target color of a conversion-desired color region, wherein the representative value is a value included in the conversion-desired color region, and the final target value is determined by using the representative value and a reference target point assigned to the conversion-desired color region;
    executing a color conversion of the pixels in at least one conversion-desired color region, including the conversion-desired color region, among the one or more preset color regions that include the pixels; and
    outputting an image formed by the color-converted pixels;
    wherein the preset color regions are defined prior to initially loading an image for display,
    color conversion of one color region may supersede the color conversion of another color region, and
    the color conversion is performed by moving the pixels close to the final target value.

11. The method of claim 10, further comprising determining the at least one conversion-desired color region with reference to a combination of the one or more color regions that include the pixels.

12. The method of claim 10, wherein the executing of the color conversion comprises applying weight values to the at least one conversion-desired color region, wherein the weight value correspond to combinations of the one or more color regions.

13. The method of claim 12, further comprising extracting the weight values.

14. The method of claim 10, wherein the executing of the color conversion comprises applying weight values of the one or more color regions to the at least one conversion-desired color region, wherein the weight values are generated with reference to a frequency of each of the colors that correspond to the one or more preset color regions.

15. The method of claim 14, further comprising generating the weight values.

16. The method of claim 10, wherein the judging of whether the pixels are included in the one or more preset color regions includes using a straight line or curve equation to differentiate the one or more preset color regions from each other.

17. The method of claim 10, wherein the representative value is a mean value or a highest frequency value of the colors of the pixels included in the at least one conversion-desired color region.

18. The method of claim 10, wherein the final target color is positioned at a distance proportional to the distance between the representative value and the reference target point, and at a point symmetrical to the representative value in reference to the reference target point.

19. A preferred color reproducing method, comprising:
determining if colors of an input image are included in one or more different preset color regions of the input image;
determining a representative value of the input image and a final target color of a conversion-desired color region, wherein the representative value is a value included in the conversion-desired color region, and the final target value is determined by using the representative value and a reference target point assigned to the conversion-desired color region;
generating or extracting weight values that are used to convert the colors of the one or more different color regions, including the conversion-desired color region, based on whether the colors of the input image are included in one, two or more, or none of the one or more different color regions; and
selectively performing color conversion of the colors of the input image based on the generating or the extracting;
wherein the preset color regions are defined prior to initially loading an image for display,
color conversion of one color region may supersede the color conversion of another color region, and
the color conversion is performed by moving the pixels close to the final target value.

20. The preferred color reproducing method of claim 19, wherein the one or more different color regions include a skin color region, a red color region, and/or a green color region.

21. The preferred color reproducing method of claim 20, wherein if the weight values used to convert the colors of the one or more different color regions are assigned, a sum of a weight value allocated to the skin color region, the red color region, and the green color region is one.

22. The preferred color reproducing method of claim 19, wherein if the colors of the input image are included in none of the one or more different color regions, the color conversion is not performed.

23. A preferred color reproducing apparatus, comprising:
a processor to determine whether colors of an input image are included in one or more different preset color regions of the input image, to determine a representative value of the input image and a final target color of a conversion-desired color region, wherein the representative value is a value included in the conversion-desired color region, and the final target value is determined by using the representative value and a reference target point assigned to the conversion-desired color region, to generate or extract weight values that are used to convert the colors of the one or more different color regions, including the conversion-desired color region, based on whether the colors of the input image are included in one, two or more, or none of the one or more different color regions, and to selectively perform color conversion of the colors of the input image based on the generating or the extracting; and
a display to display an output image containing color-converted input image;
wherein the preset color regions are defined prior to initially loading an image for display,
color conversion of one color region may supersede the color conversion of another color region, and
the color conversion is performed by moving the pixels close to the final target value.

24. The preferred color reproducing apparatus of claim 23, wherein the one or more different color regions include a skin color region, a red color region, and/or a green color region.

25. The preferred color reproducing apparatus of claim 24, wherein if the weight values used to convert the colors of the one or more different color regions are assigned, a sum of a weight value allocated to the skin color region, the red color region, and the green color region is one.

26. The preferred color reproducing apparatus of claim 23, wherein if the colors of the input image are included in none of the one or more different color regions, the processor does not perform the color conversion.

27. A preferred color reproducing method, comprising:
determining if colors of an input image are included in one or more different color regions of the input image;
selectively setting the one or more different color regions to undergo color conversion, or assigning weight values that are used to convert the colors of the one or more different color regions, based on whether the colors of the input image are included in one, two or more, or none of the one or more different color regions; and
selectively performing color conversion of the colors of the input image based on the setting or the assigning, wherein
the one or more different color regions include a skin color region, a red color region, and/or a green color region; and
if the one or more different color regions are set to undergo color conversion, a conversion of the red color region supersedes a conversion of the green color region and a conversion of the skin color region supersedes the conversion of the red color region.

28. A preferred color reproducing apparatus, comprising:
a processor to determine whether colors of an input image are included in one or more different color regions of the input image, to selectively set the one or more different color regions to undergo color conversion or assigning weight values that are used to convert the colors of the one or more different color regions based on whether the colors of the input image are included in one, two or more, or none of the one or more different color regions, and to selectively perform color conversion of the colors of the input image based on the setting or the assigning; and
a display to display an output image containing color-converted input image, wherein the one or more different color regions include a skin color region, a red color region, and/or a green color region; and if the one or more different color regions are set to undergo color conversion, a conversion of the red color region supersedes a conversion of the green color region and a conversion of the skin color region supersedes the conversion of the red color region.

* * * * *